United States Patent [19]
Tolbert et al.

[11] Patent Number: 5,988,018
[45] Date of Patent: Nov. 23, 1999

[54] MECHANICAL WIRE STRIPPER

[76] Inventors: Thomas R. Tolbert, 277 S. Fair View La.; Tony Locke, 900 Ave. O, both of Ely, Nev. 89301

[21] Appl. No.: 08/970,848

[22] Filed: Nov. 14, 1997

[51] Int. Cl.$^6$ ..................................................... H02G 1/12
[52] U.S. Cl. ............................... 81/9.4; 81/9.41; 81/9.42; 81/9.43
[58] Field of Search ........................... 81/9.4, 9.41, 9.42, 81/9.43

[56] References Cited

U.S. PATENT DOCUMENTS

| | | | |
|---|---|---|---|
| 562,097 | 6/1896 | Rieckel | 30/90.7 |
| 1,275,225 | 8/1918 | Cleve . | |
| 1,866,095 | 7/1932 | Foley | 30/90.7 |
| 1,885,944 | 11/1932 | Pedersen . | |
| 3,554,243 | 1/1971 | DeRose et al. . | |
| 4,449,298 | 5/1984 | Putz . | |
| 4,536,957 | 8/1985 | Britton . | |
| 4,577,405 | 3/1986 | Butler . | |
| 4,656,893 | 4/1987 | Hudson | 81/9.51 |
| 4,785,535 | 11/1988 | Nespor . | |
| 4,945,788 | 8/1990 | Matthews . | |
| 4,977,671 | 12/1990 | Ducret | 30/90.2 |
| 5,140,873 | 8/1992 | Schwartzman . | |
| 5,230,260 | 7/1993 | Bell . | |
| 5,582,078 | 12/1996 | Talley . | |

*Primary Examiner*—David A. Scherbel
*Assistant Examiner*—Sinclair Skinner
*Attorney, Agent, or Firm*—Morriss, Bateman, O'Bryant & Compagni

[57] ABSTRACT

A method and apparatus for stripping housing from a cable. The apparatus includes a frame having an interior channel or passage for receiving a cable therethrough and an exterior. The frame has a guide coupled to the frame interior for supporting the cable when the cable is received through the frame and moved axially therethrough. Disposed in the frame is an adjustable shaft having a first end and a second end. The shaft is adjustably coupled to the frame so that the first end is disposed in the frame interior opposite the guide and can be quickly and safely adjusted relative to the guide depending on the size of cable disposed therein. The first end also has a blade attached thereto for splitting the housing of the cable when the cable is moved axially through the frame interior while supported by the guide. The guide supports the cable so that the housing on the cable is perforated by the blade when the adjustable shaft is adjusted to press the blade against the cable. The frame exterior has a separator mechanism adjustably coupled thereto for efficiently stripping split cable housing from the cable.

30 Claims, 4 Drawing Sheets

MECHANICAL WIRE STRIPPER

BACKGROUND OF THE INVENTION

1. The Field of the Invention

This invention relates generally to a wire stripper through which cables are passed to remove a housing from the cable. More particularly, the present invention relates to a method and apparatus by which a housing can be quickly removed from an entire cable with relatively little cost or effort.

2. The Background Art

There is currently a significant demand for scrap copper and other metals which can be melted down for formation into desired products. One widely available source for scrap metal is wire segments which, for a variety of reasons, are not being used. For example, a large number of pieces of copper wire are typically left over after wiring a house. Likewise, many businesses have large roles of cable which are no longer useable for a variety of reasons.

If the metal conductor in the scrap cable is to be used, the insulative housing about the conductor must be removed. Thus, many salvage yards require the housing to be stripped from the conductor before it will be accepted as scrap. To strip the housing from the cables, a wire stripping tool is usually used. This procedure is often referred to as "stripping" the wire. Those skilled in the art have also been known to refer to this art as "peeling" the cable core. The wire stripping tools that are currently in use for accomplishing this task range from sophisticated machinery to simple hand tools.

A common element in most wire stripping tools is some sort of blade to split the housing on a cable. A split housing prepares the housing for removal from the cable. However, these tools are often undesirable for quick and easy removal of vast amounts of housing from large volumes of cable. For example, if sophisticated machinery is used to remove housing from cable, the procedure is expensive. Obtaining the machinery requires significant up-front costs and maintaining the machinery in working order requires continual observation and periodic repairs. A common problem for such machinery occurs when the machinery jams from the constant influx of cable being stripped. When cable is constantly input into the machinery, the machinery jams because the stripped housing is not efficiently disposed of and the stripped housing sometimes tangles within the machinery and interferes with new cable being input therein.

Another example of problems in the art is when hand tools are used. Existing hand tools for stripping wire do not allow for quick removal of housing from cable because precise adjustments that account for wire diameter or length must be made prior to removing housing from a particular cable. Thus, an undesirable amount of time may be required to remove cable housing.

Another disadvantage of using hand tools for removing cable housing from large amounts of cable is safety. Safety is compromised when the user must manipulate a bladed hand tool in one hand and an elongate cable in the other hand. This scenario requires significant coordination and thus may be unsafe even for highly skilled users.

When in use, the available hand tools also are known to jam when large volumes of cable or wire are fed through a cable guide. This jamming occurs when the housing that is being stripped gets caught between parts of the tool or when the cable itself lodges between the parts of the tool.

Of current interest is a wire stripping tool that is inexpensive, easy to operate, safe, and designed to quickly strip housing from large volumes of cable. In view of the foregoing, it would be an advance in the art to provide a wire stripping tool that is inexpensive to build, inexpensive to operate, conducive to quick removal of cable sheathing, and designed so as to provide a smooth flow of cable through the tool.

OBJECTS AND SUMMARY OF THE INVENTION

It is an object of the present invention to provide a method and apparatus for peeling the outer jacket from large amounts of cable in a short amount of time.

It is a primary object of the present invention to provide a method and apparatus for safely removing cable housing from large amounts of cable in a short amount of time.

It is another object of the invention to provide such a method and apparatus configured to enable quick adjustment of the apparatus relative to the size of cable inserted into the apparatus.

It is also an object of the invention to provide such a method and apparatus configured for preventing jamming of cables or cable housing within the apparatus.

It is a further object of the invention to provide such a method and apparatus configured for efficient disposal of the housing that is removed from the cable.

The above objects and others not specifically recited are realized through a method and apparatus for stripping housing from a cable. The apparatus includes a frame having an interior for receiving a cable therethrough and an exterior. The frame has a guide coupled to the frame interior for supporting the cable when the cable is received in the frame and moved axially therethrough. Disposed in the frame is an adjustable shaft having a first end and a second end. The shaft is adjustably coupled to the frame so that the first end is disposed in the frame interior opposite the guide and can be adjusted relative to the guide depending on the size of cable disposed therein. The first end also has a blade attached thereto for splitting the housing of the cable when the cable is moved axially through the frame interior while supported by the guide. The guide supports the cable so that the housing on the cable is perforated by the blade when the adjustable shaft is adjusted to press the blade against the cable.

In accordance with one aspect of the invention, the guide is configured by a pair of rollers which are disposed in a "V"-shaped configuration. The rollers are disposed so as to nest the wire as it is drawn through the interior of the housing and as it is cut by the blade attached to the adjustable shaft. The rollers assist in smoothly moving the wire along the blade, and help to hold the wire in the proper position.

In accordance with another aspect of the invention, a mechanism is provided to simply and efficiently remove the housing from the wire as it is drawn through the interior of the frame to thereby ensure separation of the housing from the cable. The mechanism is often a rod protruding from the frame at an angle whereby the rod end catches the cable housing and separates the housing from the cable as the cable is drawn through the frame.

Additional objects and advantages of the invention will be set forth in the description which follows, and in part will be apparent from the description, or may be learned by the practice of the present invention. The objects and advantages of the invention may be realized and obtained by means of the instruments and combinations particularly claimed in the appended claims.

BRIEF DESCRIPTION OF THE DRAWINGS

The above and other objects, features, and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

Figure 1:
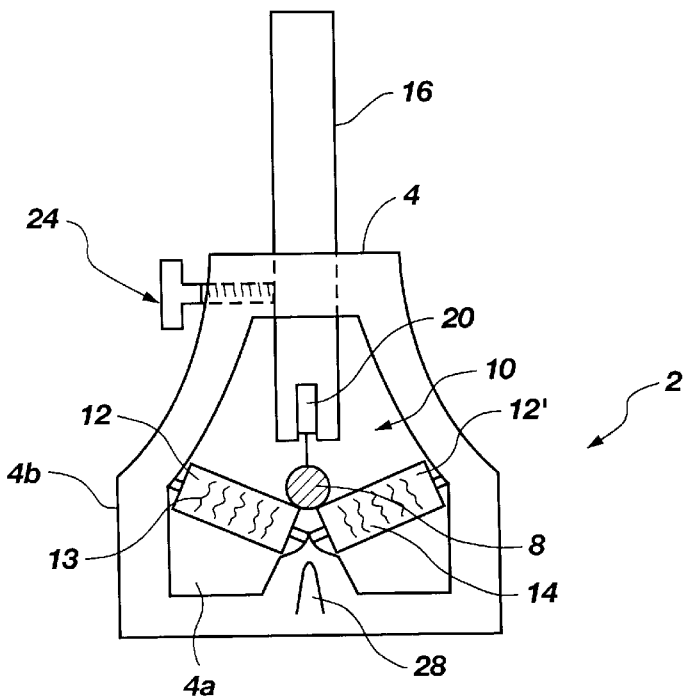
FIG. 1 is a front view of the wire stripper of the present invention showing a cross sectional view of a wire being stripped as it is moved through the apparatus.

FIG. 1 is a front view of one embodiment of a wire stripper 2 of the present invention. Although the apparatus is called a wire stripper, the apparatus can be used for many applications. For example, the wire stripper 2 is for stripping housing, insulation, sheathing, or a jacket from a wire, a cable, an electric line, a cable core, or other conductor. The wire stripper 2 includes a frame 4 having an interior 4a for receiving a cable 8 therethrough and an exterior 4b. The frame 4 is commonly made from steel, titanium, anodized aluminum, etc., but any hardened material that is suitable for rugged treatment without breaking is acceptable material. The frame interior 4a has a channel or passage 10 for receiving the cable 8 and a rotatable guide 12 coupled to the frame interior for supporting the cable when the cable is received through the frame.

The guide 12 of FIG. 1 is formed from two rotatable cylinders 14 that are placed at an angle with respect to one another to form a "V" shape. The angle of the "V" may be between 30 and 160 degrees, although 100 to 140 degrees is preferred. The angle of the V-shaped guide 12 causes the cable 8 to rest at the interior base of the "V" shape. Thus, the cable can be moved axially therethrough without substantial lateral movement or slipping off the guide 12. To further discourage lateral movement of the cable as it moves through the frame 4 to be stripped, the surfaces of the rotatable cylinders are knurled or otherwise textured. The knurled/textured surface interacts with the housing to provide additional resistance to lateral movement.

Prior to moving the cable 8 through the frame 4 on the guide 12, an adjustable shaft 16 is positioned relative to the cable.

The adjustable shaft 16 has a first end, a second end, and is adjustably coupled to the frame. The first end of the shaft 16 is disposed in the frame interior opposite the rotatable guide 12 and has a blade 20 attached thereto for splitting the housing of the cable 8 when the cable is moved axially through the frame interior while supported by the guide 12. The shaft 16 of the embodiment shown in FIG. 1 has a rectangular shape with flat surfaces on each of the sides and is adjustable by sliding the shaft either up or down in the frame 4. When the shaft 16 is moved into a desired position, it is secured in the desired position with a locking mechanism 24.

The locking mechanism 24 shown in FIG. 1 is a threaded bolt that screws into a matching threaded opening in the frame 4. In this embodiment, to hold the shaft 16 in position, a user turns the bolt to cause the bolt to apply pressure against the shaft 16 as it moves into the opening. Thus, the bolt holds the shaft in its current position when engaged. Those skilled in the art understand that other embodiments are possible and other embodiments will be described below.

Figure 2:
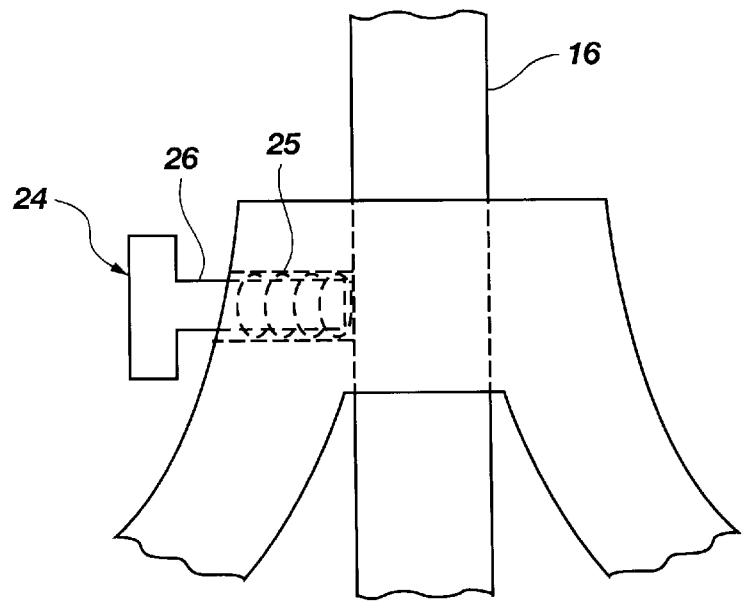
FIG. 2 illustrates a front partial view of the wire stripper of the present invention, wherein a spring locking mechanism is shown in dotted lines.

For example, FIG. 2 shows another embodiment of the locking mechanism 24 where a partial view of the wire stripper 2 is illustrated with the details of the locking mechanism 24 shown in dotted lines. The embodiment is a spring 25 arrangement with a post 26 that engages with the shaft 16. At one end, the spring 25 is coupled to the post 26, while at the other end, the spring is coupled to the frame 4. When the post 26 is at rest, the spring 25 forced he post against the shaft 16. The spring 25 holds the post 26 against the shaft 16 unless the post is pulled away from the shaft by a user adjusting the position of the shaft. When the user releases the post 26, the spring 25 again holds the post against the shaft 16 and the shaft will not move. This spring 25 arrangement provides for quick and safe adjustment of the blade 20 of the adjustable shaft. In light of the present disclosure, other arrangements of the locking mechanism 24 will become apparent to those skilled in the art upon viewing the disclosure of this application.

Figure 3:
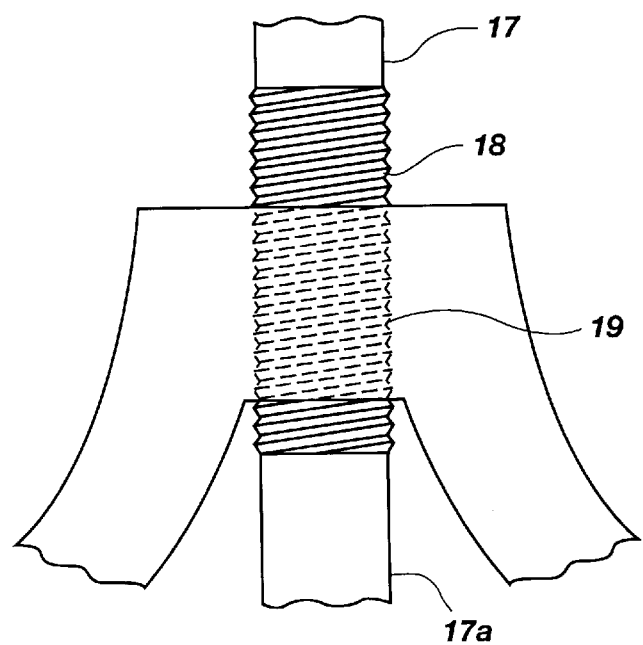
FIG. 3 illustrates a front partial view of the wire stripper of the present invention, wherein threads are shown on an adjustable shaft and in the opening of the frame.

Turning now to FIG. 3, there is shown an alternate embodiment for the slidable shaft 16. Rather than a slidable shaft with a locking mechanism, the adjustable shaft 16 of the wire stripper 2 is a cylinder 17 with threads 18 disposed thereon. The threads 18 of the cylinder 17 correspond with threads 19 in an opening of the frame. This frame opening is configured for receiving the threads 18 of the cylinder 17. The threaded arrangement allows the cylinder first end 17a to be adjusted with respect to the rotatable guide 12. Of course, such a mechanism would include a means for maintaining the blade in alignment with the long axis of the wire as it is drawn through the frame.

Returning to the embodiment of FIG. 1, the rotatable guide 12 supports the cable 8 so that the housing on the cable is perforated by the blade 20 when the adjustable shaft 16 is adjusted to press the blade against the cable and the locking mechanism 24 is set to hold the shaft and blade in position while the cable is moved through the frame 4 of the wire stripper 2.

Figure 4:
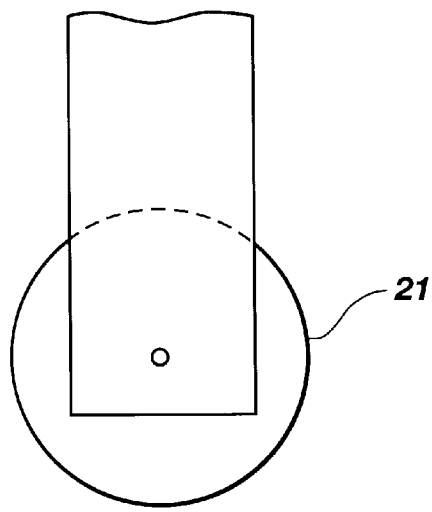
FIG. 4 shows a partial side view of a circular blade of an adjustable shaft of the wire stripper of the present invention.
Figure 5:
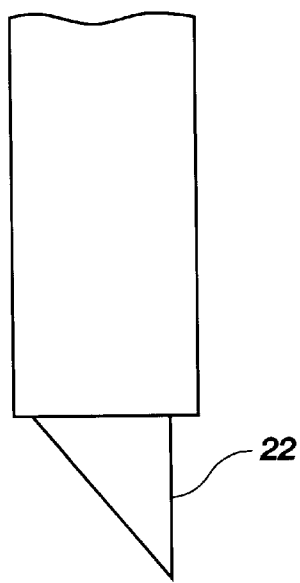
FIG. 5 shows a partial side view of a sharpened edge blade of an adjustable shaft of the wire stripper of the present invention.

An embodiment of the blade 20 of the wire stripper 2 is shown in FIG. 4. FIG. 4 shows the blade 20 embodiment as a rotatable disk 21 having a sharpened perimeter for perforating the cable housing when the rotatable disk is rolled along the cable axis. The rotatable disk 21 rolls because it is coupled to the adjustable shaft with an axle and the adjustable shaft is recessed to accommodate the path of the sharpened perimeter. In another embodiment, shown in FIG. 5, the blade 20 has a sharpened edge 22 for splitting the cable housing when the sharpened edge perforates the cable housing and the cable is axially pulled through the frame. Although the FIG. 5 embodiment is simple to manufacture, the FIG. 4 embodiment is preferred for performance. Those skilled in the art, in light of the present disclosure, will understand that other embodiments are possible for realizing the blade of the present invention.

Also shown in FIG. 1 is a knurled surface 13 on the rotatable guides 12. This knurled surface 13 adds a friction element to the guides 12 so that when the cable is pulled through the wire stripper 2, the guides 12 rotate with the cable movement, and inhibit lateral movement of the cable. Rotation of the guides 12 advantageously provides for quick stripping of the cable that is moved through the wire stripper 2 because rotation prevents the stripper from jamming. Although FIG. 1 illustrates the raised surface 13, those skilled in the art will understand that other embodiments are possible for providing a frictional element on the rotatable guides 12. For example, a high friction synthetic coating could be placed on each guide.

Figure 6:
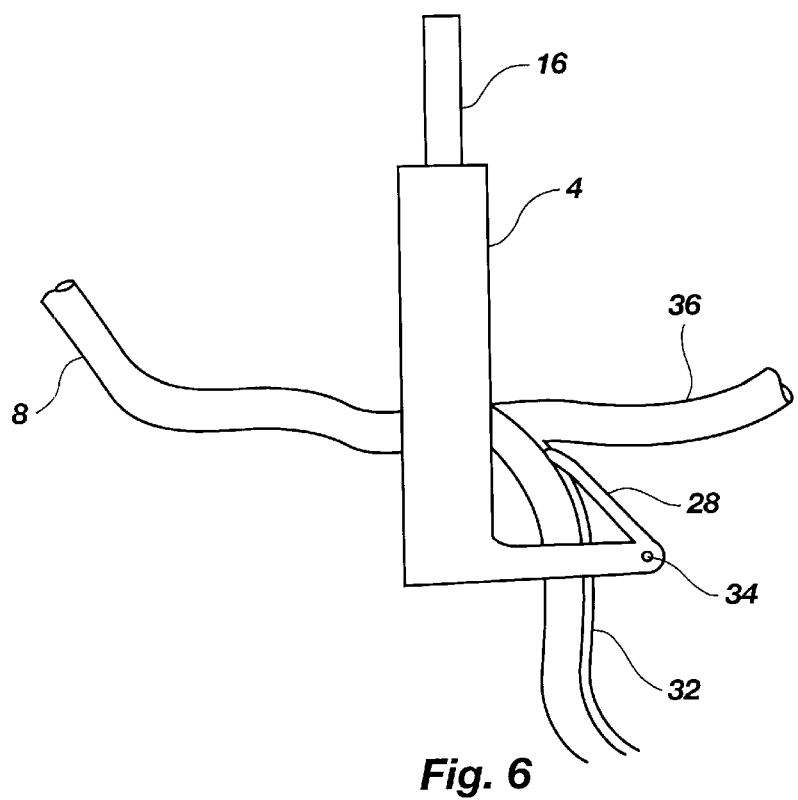
FIG. 6 is a side view of the wire stripper of the present invention showing a cable before and after it passes through the wire stripper and showing one embodiment of a stripper rod for separating the cable core from the cable housing.

Referring now to FIG. 6, which shows a side view of the wire stripper of FIG. 1, there is shown the additional element of a separator or stripper rod 28. FIG. 6 shows this stripper rod 28 in greater detail. The stripper rod 28 is coupled to the frame 4 and positioned such that the cable housing 32, after being split by the blade 20, is separated from a cable core 36 as the cable 8 passes through the frame interior. A hinge 34 may be provided so that the stripper rod 28 can be adjusted to accommodate various size cables. The stripper rod 28 is coupled to the frame 4 with the hinge 34, with a slidable arrangement, or with other embodiments understood by those skilled in the art when viewing the present disclosure. An adjustable stripper rod 28 is also useful for arranging an efficient disposal system for housing 32 that is stripped from the cable 8.

Figure 7:
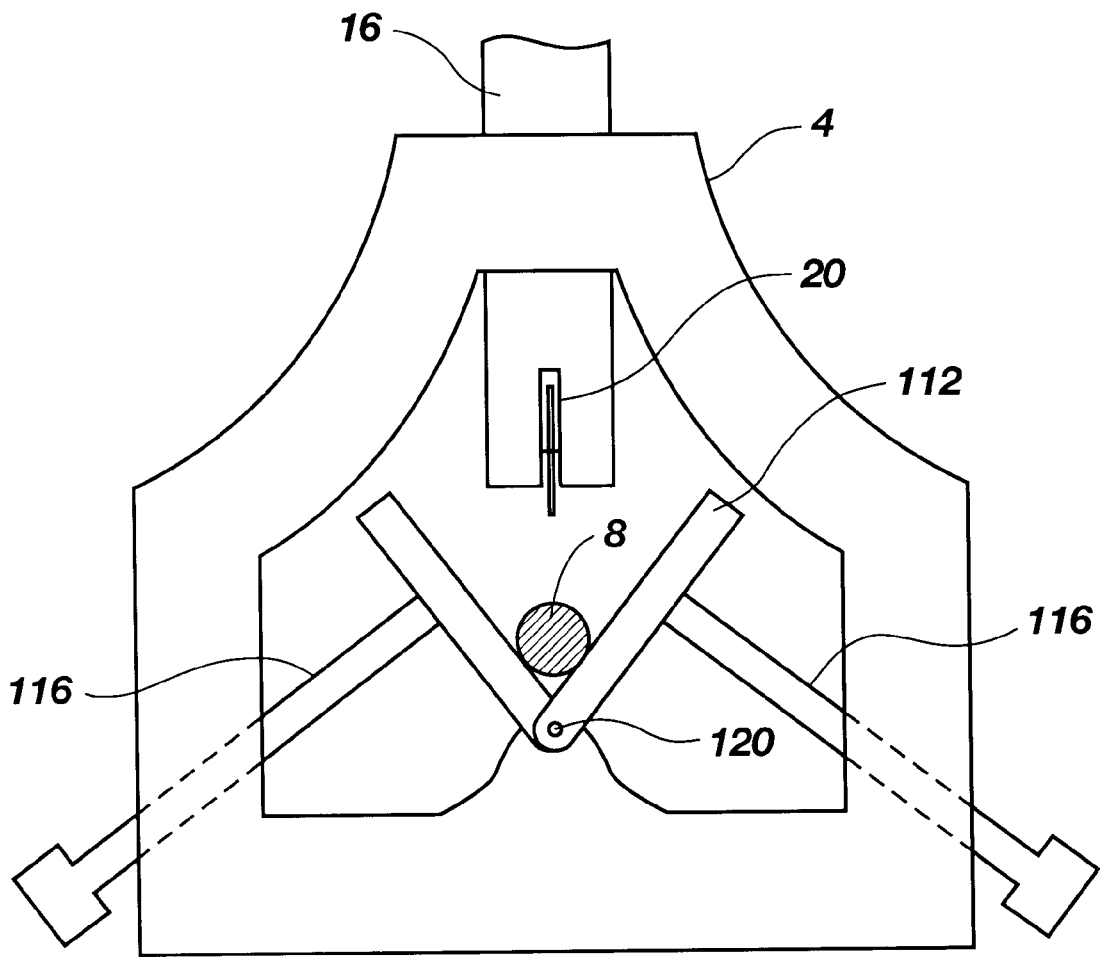
FIG. 7 is a front view of an embodiment of the wire stripper of the present invention showing a cross sectional view of a wire being stripped as it is moved through the apparatus.

FIG. 7 illustrates yet another embodiment of the wire stripper of the present invention. Although FIG. 1 shows the guide 12 including cylinders, the guide could be realized through other structures. For example, FIG. 7 shows the guide as a "V" shaped bracket 112 rather than rotatable cylinders positioned in a "V" arrangement. This "V" bracket 112 performs a function similar to the rotatable cylinders by supporting the cable 8 as it moves through the frame 4 interior. The "V" bracket 112 supports the cable when pressure is placed on the cable from the blade 20 of the adjustable shaft 16. It should be noted that the "V" bracket can also be adjusted to have a base angle between 30 and 160 degrees, preferably between 100 to 140 degrees, by shafts 116 passing through the frame 4. Although these shafts are commonly threaded for quick and precise adjustment of the "V" bracket 112 when different size cables are placed therein, the shafts can be adjusted with a locking mechanism similar to the locking mechanism 24 of FIGS. 1 and 2. Also of note is a hinge 120 that connects the two sides of the "V" bracket together at the base of the "V". Many of the features described relative to FIGS. 1–6 can be implemented with respect to FIG. 7. Thus, the descriptions relating to FIGS. 1–6 above are hereinafter incorporated with respect to FIG. 7.

In light of the present disclosure, those skilled in the art will appreciate that certain modifications must be made in order for the V-bracket 112 to operate in a manner similar to the guides of FIG. 1. Specifically, while the guides 12 of FIG. 1 are preferably formed with a high friction surface, such as with a knurled surface or a high friction coating, the V-bracket will preferably be formed of a very low friction material such as polished metal or low friction plastic. Because the V-bracket 112 does not rotate with axial movement of the wire, utilizing a high friction surface on the parts of the bracket which contact the wire will tend to increase the pull required to draw the wire through the frame and will also cause additional bunching and jamming of the system.

With the apparatus of FIGS. 1 through 7, a user can strip housing from a wire by the following steps:

(a) positioning the cable axially within a frame, the frame having a blade, a guide, and a separator disposed thereon;

(b) adjusting the blade to perforate the housing of the cable when the cable is positioned on the guide of the frame; and (c) pulling the cable axially through the frame so as to split the housing of the cable with the blade and strip the housing from the cable with the separator.

Another common step for stripping cable with the present invention is to place the wire stripper base into a vice. In this manner, the wire stripper is stable and usable without the use of hands to support the stripper.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An apparatus for stripping housing from a cable comprising:

a frame having an interior for receiving a cable therethrough;

a rotatable guide means coupled to the frame interior for supporting the cable when the cable is received through the frame and moved axially therethrough, said rotatable guide means comprising at least one rotatable cylinder disposed at an angle between horizontal and vertical so as to form at least one lateral side of a V-shaped wire guide for encouraging a wire being drawn therethrough to nest in the bottom of the V-shaped wire guide;

an adjustable shaft having a first end, a second end, and being adjustably coupled to the frame, the first end disposed in the frame interior opposite the rotatable guide means and having a cutting means attached thereto for splitting the housing of the cable when the cable is moved axially through the frame interior while supported by the guide means and wherein, the rotatable guide means supports the cable so that the housing on the cable is perforated by the cutting means when the adjustable shaft is adjusted to press the cutting means against the cable.

2. The apparatus of claim 1, wherein the rotatable guide means comprises at least two rotatable cylinders angularly disposed in the frame interior for forming the V-shaped wire guide and supporting the cable when the cable is received through the frame and moved axially therethrough.

3. The apparatus of claim 2, wherein the two rotatable cylinders of the rotatable guide means are disposed in substantially a "V" shape having an angle with respect to each other, the angle being from 30 degrees to 160 degrees, so as to form the V-shaped wire guide.

4. The apparatus of claim 3, wherein the two rotatable cylinders are disposed at an angle between 100 and 140 degrees.

5. The apparatus of claim 2, wherein the two rotatable cylinders comprise friction means disposed thereon for contact with the cable disposed thereon.

6. The apparatus of claim 1, wherein the frame and the adjustable shaft each include threads disposed thereon, the threads of the frame configured for receiving the threads of the adjustable shaft, the threads for adjusting the shaft first end with respect to the rotatable guide means.

7. The apparatus of claim 1, wherein the frame slidably engages the adjustable shaft for adjusting the shaft first end with respect to the rotatable guide means, the frame having a locking mechanism for securing the shaft when the shaft is disposed in a desirable position.

8. The apparatus of claim 1, wherein the cutting means of the first end of the adjustable shaft comprises a rotatable disk having a sharpened perimeter for perforating the cable housing when the rotatable disk is rolled along the cable axis.

9. The apparatus of claim 1, wherein the cutting means of the first end of the adjustable shaft comprises a sharpened edge for splitting the cable housing when the sharpened edge perforates the cable housing and the cable is axially pulled through the frame.

10. The apparatus of claim 1, wherein the frame comprises a stripper rod coupled to the frame and positioned operationally distally of the wire guide such that the cable housing is separated from a cable core as the cable passes through the frame interior.

11. An apparatus for stripping sheathing from an elongate electrical line comprising:
   a frame having an exterior and an interior, the interior having a passage for receiving the elongate electrical line therethrough;
   a guide means coupled to the frame interior for supporting the elongate electrical line when the line is received through the frame passage and moved axially therethrough;
   a stripper rod adjustably coupled to the frame exterior and positioned such that the sheathing of the elongate electrical line is separated from the line as the line moves axially through the frame interior;
   an adjustable shaft having a first end, a second end, and being adjustably coupled to the frame, the first end disposed in the frame interior opposite the guide means and having a cutting means attached thereto for splitting the sheathing of the electrical line when the line is moved axially through the frame passage while supported by the guide means; and
   wherein, the guide means supports the electrical line so that the sheathing on the cable is perforated by the cutting means when the adjustable shaft is adjusted to press the cutting means against the electrical line.

12. The apparatus of claim 11, wherein the guide means comprises a "V" bracket having an adjustment means for adjusting the angle of the "V" in the bracket.

13. The apparatus of claim 11, wherein the guide means comprises two rotatable cylinders angularly disposed with respect to each other so as to define lateral sides of the "V" bracket.

14. The apparatus of claim 13, wherein the two rotatable cylinders each comprise a knurled surface for providing a frictional element upon which the elongate electrical line moves.

15. The apparatus of claim 13, wherein the two rotatable cylinders are angularly disposed at an angle from 30 to 160 degrees to form a "V" shape.

16. The apparatus of claim 15, wherein the two rotatable cylinders are angularly disposed at an angle from 100 to 140 degrees.

17. An apparatus for stripping sheathing from a cable, the apparatus comprising:
   a frame having an interior channel for receiving the cable such that the cable may be moved axially therethrough;
   a rotatable guide means disposed at least partially in the interior channel for supporting the cable as it is drawn through the frame;
   cutting means extending into the frame for cutting the sheathing as it is moved through the interior channel; and
   separating means disposed adjacent said channel for separating the sheathing from the cable as the cable is moved through the channel.

18. The apparatus of claim 17, wherein the rotatable guide means comprises two rotatable cylinders disposed in substantially a "V" arrangement, the cylinders each having a knurled surface for frictional purposes.

19. The apparatus of claim 17, wherein the cutting means comprises a disc having a sharpened perimeter and an adjustable shaft, the disc disposed on a first end of the adjustable shaft and the adjustable shaft disposed in the frame, wherein, the disc rotates on the first end of the adjustable shaft.

20. The apparatus of claim 17, wherein the cutting means comprises a sharpened edge and an adjustable shaft, the edge disposed on a first end of the adjustable shaft and the adjustable shaft disposed in the frame, wherein, the can cable be moved relative to the edge.

21. An apparatus for stripping sheathing from a cable, the apparatus comprising:
   a frame having an interior channel for receiving the cable such that the cable may be moved axially therethrough;
   a rotatable guide means disposed at least partially in the interior channel for supporting the cable as it is drawn through the frame;
   cutting means extending into the frame for cutting the sheathing as it is moved through the interior channel; and
   separating means disposed adjacent said channel for separating the sheathing from the cable as the cable is moved through the channel; and
   wherein the separating means comprises a stripper rod and an adjustable hinge for coupling the stripper rod to the frame, the adjustable hinge for adjusting a position of the stripper rod so that the stripper rod is adjusted to separate the sheathing from the cable regardless of cable diameter.

22. A method for stripping housing from a cable comprising the steps of:
   (a) positioning the cable axially within a frame, the frame having a cutting means, a guide means, and a stripping means disposed thereon;
   (b) adjusting the cutting means to perforate the housing of the cable when the cable is positioned on the guide means of the frame; and
   (c) pulling the cable axially through the frame so as to split the housing of the cable with the cutting means and strip the housing from the cable with the stripping means.

23. The method of claim 22 wherein step (a) further comprises positioning the frame within a device for securing the frame when the cable is moved through the frame.

24. The method of claim 22 wherein step (a) further comprises positioning the stripping means according to the diameter of the cable axially disposed within the frame on the guide means.

25. The method of claim 22 wherein step (c) further comprises providing a disposal means for containing the stripped housing of the cable.

26. An apparatus for removing insulation from a cable core comprising:

a frame having a guide disposed thereon for receiving a cable;

a cutting means disposed in the frame adjacent the guide, the cutting means being adjustably positioned for perforating the insulation of the cable when the cable is axially passed across the guide; and said guide comprising at least two rotatable cylinders, the at least two rotatable cylinders disposed at an angle to one another and arranged to form a V-shaped wire guide to support and nest the cable therebetween when the cutting means is adjusted to apply pressure to the insulation on the cable.

27. The apparatus of claim 26 wherein the frame comprises an interior and an exterior, the interior for receiving the cable axially therethrough.

28. The apparatus of claim 26 wherein the cutting means is disposed on an adjustable shaft, the adjustable shaft being adjustable with respect to the frame and the guide.

29. The apparatus of claim 28 wherein the cutting means is a disc having a sharpened perimeter, the disc being axially coupled to the adjustable shaft and rotatable on the axis as the cable passes through the frame and the guide.

30. The apparatus of claim 28 wherein the cutting means is a sharpened blade coupled to the adjustable shaft, the blade being adjustable by adjusting the position of the shaft.

* * * * *